(12) United States Patent
Pei et al.

(10) Patent No.: US 9,973,368 B2
(45) Date of Patent: May 15, 2018

(54) FINE TIMING

(71) Applicant: Harman International Industries, Incorporated, Stamford, CT (US)

(72) Inventors: Wenjiang Pei, Nanjing (CN); Jinguang Hao, Nanjing (CN); Kai Wang, Nanjing (CN); Zeng Yang, Shanghai (CN)

(73) Assignee: Harman Internatioanl Industries, Incorporated, Stamford, CT (US)

( * ) Notice: Subject to any disclaimer, the term of this patent is extended or adjusted under 35 U.S.C. 154(b) by 91 days.

(21) Appl. No.: 14/909,043

(22) PCT Filed: Aug. 12, 2013

(86) PCT No.: PCT/CN2013/081271
§ 371 (c)(1),
(2) Date: Jan. 29, 2016

(87) PCT Pub. No.: WO2015/021584
PCT Pub. Date: Feb. 19, 2015

(65) Prior Publication Data
US 2016/0352555 A1   Dec. 1, 2016

(51) Int. Cl.
*H04L 27/26* (2006.01)
*H04L 29/08* (2006.01)
*H04W 56/00* (2009.01)

(52) U.S. Cl.
CPC ...... *H04L 27/2656* (2013.01); *H04L 27/2646* (2013.01); *H04L 27/2671* (2013.01);
(Continued)

(58) Field of Classification Search
CPC .................................................. H04L 27/2656
See application file for complete search history.

(56) References Cited

U.S. PATENT DOCUMENTS

| 6,768,747 B1 | 7/2004 | Dogan |
| 7,920,599 B1 * | 4/2011 | Subramanian .... H04W 56/0085 370/292 |

(Continued)

FOREIGN PATENT DOCUMENTS

| CN | 101325450 A | 12/2008 |
| CN | 101442520 A | 5/2009 |

(Continued)

OTHER PUBLICATIONS

Muhammad, M. et al., "Robust synchronization for OFDM employing Zadoff-Chu sequence," 2012 46th annual conference on Information Science and Systems (CISS), Mar. 21, 2012, Princeton, New Jersey, 6 pages.

(Continued)

*Primary Examiner* — Gerald A Smarth
(74) *Attorney, Agent, or Firm* — McCoy Russell LLP

(57) ABSTRACT

A fine timing method is provided. The method comprises: calculating values of a first timing metric function based on cross-correlation between a received signal and M training sequences within a time period, to obtain a plurality of sets of X values spaced according to a certain pattern; calculating summations for the plurality of sets of X values, respectively; and determining the beginning of a data frame based on the calculated summations.

16 Claims, 4 Drawing Sheets

(52) U.S. Cl.
CPC .......... *H04L 27/2675* (2013.01); *H04L 67/12* (2013.01); *H04W 56/003* (2013.01)

(56) References Cited

U.S. PATENT DOCUMENTS

| | | | | |
|---|---|---|---|---|
| 9,237,536 | B2* | 1/2016 | Zhang | H04J 11/0073 |
| 9,674,073 | B2* | 6/2017 | Prytz | H04L 45/123 |
| 9,787,517 | B2* | 10/2017 | Pei | H04L 27/2656 |
| 2005/0152326 | A1 | 7/2005 | Vijayan et al. | |
| 2014/0079164 | A1* | 3/2014 | Zhang | H04L 27/2601 |
| | | | | 375/343 |

FOREIGN PATENT DOCUMENTS

| | | |
|---|---|---|
| CN | 101778088 A | 7/2010 |
| CN | 101925172 A | 12/2010 |
| CN | 102065048 A | 5/2011 |
| WO | 2010025780 A1 | 3/2010 |

OTHER PUBLICATIONS

Xu, Q. et al., "PROTEUS: Network Performance Forecast for Real-Time, Interactive Mobile Applications," MobiSys 2013—ACM International Conference in Mobile Systems, Applications, and Services, Jun. 1, 2013, Taipei, Taiwan, 14 pages.

European Patent Office, Extended European Search Report Issued in Application No. 13891448.6, Mar. 20, 2017, Germany, 9 pages.

IEEE Computer Society, "IEEE Standard for Information Technology—Telecommunications and Information Exchange Between Systems—Local and Metropolitan Area Networks—Specific Requirements, Part 11: Wireless LAN Medium Access Control (MAC) and Physical Layer (PHY) Specifications, Amendment 6: Wireless Access in Vehicular Environments," IEEE Std 802.11p-2010, Jul. 15, 2010, 51 pages.

ISA State Intellectual Property Office of the People's Republic of China, International Search Report and Written Opinion Issued in Application No. PCT/CN2013/081271, dated May 21, 2014, WIPO, 14 pages.

* cited by examiner

FINE TIMING

CROSS REFERENCE TO RELATED APPLICATIONS

The present application is a U.S. National Phase of International Patent Application Serial No. PCT/CN2013/081271, entitled "FINE TIMING," filed on Aug. 12, 2013, the entire contents of which are hereby incorporated by reference for all purposes.

TECHNICAL FIELD

The present application generally relates to fine timing in communication systems, more particularly, fine timing in OFDM communication systems.

BACKGROUND

IEEE 802.11p protocol, which is also called Wireless Access in Vehicular Environment (WAVE), is an approved amendment to the IEEE 802.11. It is an extension of IEEE 802.11 and conforms to corresponding applications in Intelligent Transportation System (ITS).

Similar with other 802.11 family members, frame synchronization of 802.11p mainly depends on short and long training sequences. An example of such training sequences is illustrated in FIG. 1. In this example, there are ten short training sequences $t_1 \sim t_{10}$ and two long training sequences $T_1 \sim T_2$, and the total training time is 32 μs.

In some conventional methods, frame synchronization is divided into a coarse timing process and a fine timing process. In the coarse timing process, the position of a data frame is approximately located using a first pre-set threshold and a first timing metric function based on self-correlation of the received signal. In the fine timing process, the position of the data frame is more accurately located using a second pre-set threshold and a second timing metric function based on cross-correlation between the received signal and the known training sequences. A data frame is a data packet containing certain training sequences and payload.

In such methods, the second timing metric function based on cross-correlation is used only when a data frame is detected. Since computation based on self-correlation has low complexity and relatively low precision, and computation based on cross-correlation has relatively high complexity and high precision, relatively high precision at relatively low computation complexity can be achieved by such combination.

In conventional methods, a timing metric function used in fine timing is usually defined as Equation (1), $$M(d) = \left| \sum_{k=0}^{N/2-1} r(k+d) \cdot s*(k) \right| \quad \text{Equation (1)}$$

where r(d) stands for a received signal, d stands for a time point where the received signal is sampled, s*(k) stands for conjugation of s(k), s(k) stands for the ten short training sequences known to the transmitter and the receiver, and N/2 stands for length of a short training sequence.

A threshold $C_{th}$ may be pre-set. If there are 10 successive values of the timing metric function within a time period identified by the coarse timing process, which values are evenly spaced by the length of a short training sequence and greater than $C_{th}$, it is deemed that the 10 short training sequences are located, and the time point corresponding to the first of the 10 values is taken as the beginning of the 10 short training sequences. An example of how a data frame is located is schematically shown in FIG. 2.

However, related parameters of a signal channel may change such as due to different kinds of fading. As a result, a pre-set threshold may cause errors in certain cases. For example, in some cases, the pre-set threshold may be too low, and noise may be identified as a data frame by mistake. In some cases, the pre-set threshold may be too high, and the beginning part of a frame may be missed. Therefore, more robust fine timing methods and systems are needed.

SUMMARY

In one embodiment, a fine timing method for a communication system is provided. The fine timing method may include: calculating first timing metric values based on cross-correlation between a received signal and M training sequences; identifying within a time period a set of X first timing metric values spaced according to a certain pattern which set has the greatest summation, where X is a positive integer; and determining the beginning of a data frame based on the identified set of first timing metric values.

In some embodiments, X may equal to M, and the identified set of first timing metric values are spaced according to the M training sequences.

In some embodiments, the M training sequences may have the same length, and the identified set of first timing metric values are evenly spaced by the length of one training sequence.

In some embodiments, the time period is identified by a coarse timing process.

In some embodiments, the first timing metric values may be calculated according to Equation (2):

$$a(d) = \sum_{k=0}^{Q/2-1} r(k+d) \cdot s*(k). \quad \text{Equation (2)}$$

where r(d) stands for a received signal, d stands for a time point where the received signal is sampled, s*(k) stands for conjugation of s(k), s(k) stands for the M training sequences known to the transmitter and the receiver, and Q may be any suitable number, for example, Q may be two times the length of one training sequence.

In some embodiments, calculating the first timing metric values may include: calculating second timing metric values based on cross-correlation between the received signal and the M training sequences; and calculating the first timing metric values based on self-correlation of the second timing metric values.

In some embodiments, the first timing metric values may be calculated according to Equation (3) or Equation (4):

$$a(d) = M_1(d) \cdot M_1(d+P \cdot L) \quad \text{Equation (3)}$$

$$a(d) = M_1(d) \cdot M_1(d-P \cdot L) \quad \text{Equation (4)}$$

where $M_1(d)$ stands for second timing metric function according to which the second timing metric values are calculated, L stands for the length of one training sequence, P is a predetermined positive integer and $1 \leq P \leq M-2$, X may equal to M−P, and $M_1(d)$ may be calculated according to Equation (5):

$$M_1(d) = \sum_{k=0}^{Q/2-1} r(k+d) \cdot s*(k).\qquad\text{Equation (5)}$$

In one embodiment, a fine timing method for a communication system is provided. The method may include: calculating values of a first timing metric function based on cross-correlation between a received signal and M training sequences within a time period, to obtain a plurality of sets of X values spaced according to a certain pattern; calculating summations for the plurality of sets of X values, respectively; and determining the beginning of a data frame based on the calculated summations.

In some embodiments, the M training sequences may have the same length, and the X values of each set may be evenly spaced by the length of one training sequence.

In some embodiments, the first timing metric function may be based on self-correlation of a second timing metric function which may be a cross-correlation function between the received signal and the M training sequences.

In some embodiments, the first timing metric function may be based on multiplication of $M_1(d)$ and $M_1(d+P \cdot L)$, where $M_1(d)$ may be a cross-correlation function between the received signal and the M training sequences, where L stands for the length of one training sequence, P is a predetermined positive integer and $1 \le P \le M-2$, X may equal to M−P.

In one embodiment, a fine timing method is provided. The method may include: calculating values of a first timing metric function based on cross-correlation between a received signal and M training sequences, to obtain a plurality of sets of X calculated values spaced according to a certain pattern within a predetermined time period; calculating summations for the plurality of sets of X values, respectively; and determining the beginning of a data frame based on the calculated summations.

In one embodiment, a fine timing method is provided. The method may include: calculating values of a first timing metric function based on cross-correlation between a received signal and M training sequences; identifying within a predetermined time period a set of X calculated values spaced according to a predetermined pattern which set has the greatest summation; and determining the beginning of a data frame based on the identified set of X calculated values.

In one embodiment, a fine timing system for a communication system is provided. The system may include: a timing metric value calculating device for calculating first timing metric values based on cross-correlation between a received signal and M training sequences; and a data frame locating device for identifying within a time period a set of X first timing metric values spaced according to a certain pattern which set has the greatest summation, and determining where a data frame begins based on the identified set of first timing metric values.

In some embodiments, X may equal to M, and the identified set of first timing metric values are spaced according to the M training sequences.

In some embodiments, the M training sequences may have the same length, and the identified set of first timing metric values are evenly spaced by the length of one training sequence.

In some embodiments, the time period is identified by a coarse timing process.

In some embodiments, the first timing metric values may be calculated according to Equation (2):

$$a(d) = \sum_{k=0}^{Q/2-1} r(k+d) \cdot s*(k)\qquad\text{Equation (2)}$$

where r(d) stands for a received signal, d stands for a time point where the received signal is sampled, s*(k) stands for conjugation of s(k), s(k) stands for the M training sequences known to the transmitter and the receiver, and Q may be any suitable number, for example, Q may be two times the length of one training sequence.

In some embodiments, calculating the first timing metric values may include: calculating second timing metric values based on cross-correlation between the received signal and the M training sequences; and calculating the first timing metric values based on self-correlation of the second timing metric values.

In some embodiments, the first timing metric values may be calculated according to Equation (3) or Equation (4):

$$a(d)=M_1(d) \cdot M_1(d+P \cdot L)\qquad\text{Equation (3)}$$

$$a(d)=M_1(d) \cdot M_1(d-P \cdot L)\qquad\text{Equation (4)}$$

where $M_1(d)$ stands for second timing metric function according to which the second timing metric values are calculated, L stands for the length of one training sequence, P is a predetermined positive integer and $1 \le P \le M-2$, X may equal to M−P, and $M_1(d)$ may be calculated according to Equation (5):

$$M_1(d) = \sum_{k=0}^{Q/2-1} r(k+d) \cdot s*(k).\qquad\text{Equation (5)}$$

In one embodiment, a fine timing system for a communication system is provided. The system may include: a timing metric value calculating device for calculating values of a first timing metric function based on cross-correlation between a received signal and M training sequences within a time period, where there are a plurality of sets of X values spaced according to a certain pattern in the calculated values of the first timing metric function; a data frame locating device for calculating summations for the plurality of sets of X values, respectively, and determining the beginning of a data frame based on the calculated summations.

In some embodiments, the M training sequences may have the same length, and the X values of each set may be evenly spaced by the length of one training sequence.

In some embodiments, the first timing metric function may be based on self-correlation of a second timing metric function which may be a cross-correlation function between the received signal and the M training sequences.

In some embodiments, the first timing metric function may be based on multiplication of $M_1(d)$ and $M_1(d+P \cdot L)$, where $M_1(d)$ may be a cross-correlation function between the received signal and the M training sequences, where L stands for the length of one training sequence, P is a predetermined positive integer and $1 \le P \le M-2$, X may equal to M−P.

In one embodiment, a fine timing system is provided. The system may include: means for calculating first timing metric values based on cross-correlation between a received signal and M training sequences having the same length L; means for identifying within a time period a predetermined number of first timing metric values, evenly spaced by L, whose summation is greatest; and determining where a data frame begins based on the identified first timing metric values.

In one embodiment, a fine timing system for a communication system is provided. The system may include: means for calculating values of a first timing metric function based on cross-correlation between a received signal and M training sequences within a time period, where there are a plurality of sets of X values spaced according to a certain pattern in the calculated values of the first timing metric function; means for calculating summations for the plurality of sets of X values, respectively; and means for determining the beginning of a data frame based on the calculated summations.

In some embodiments, the M training sequences may have the same length, and the X values of each set may be evenly spaced by the length of one training sequence.

In some embodiments, the first timing metric function may be based on self-correlation of a second timing metric function which may be a cross-correlation function between the received signal and the M training sequences.

In some embodiments, the first timing metric function may be based on multiplication of $M_1(d)$ and $M_1(d+P \cdot L)$, where $M_1(d)$ may be a cross-correlation function between the received signal and the M training sequences, where L stands for the length of one training sequence, P is a predetermined positive integer and $1 \leq P \leq M-2$, X may equal to M−P.

In some embodiments, the fine timing methods and systems may be used in Orthogonal Frequency Division Multiplexing (OFDM) communication systems.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
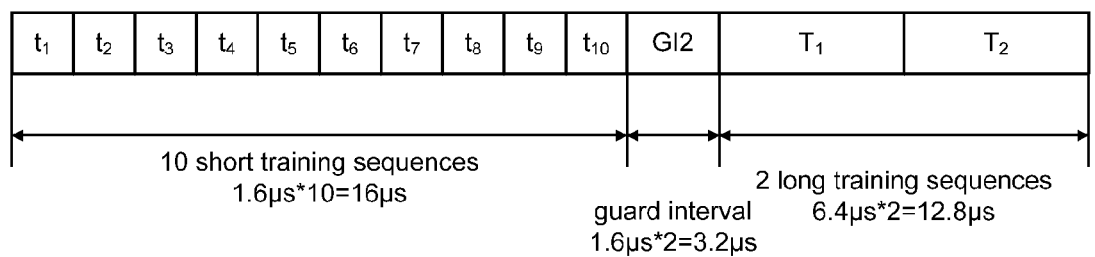
FIG. 1 illustrates an example of a complete training sequence of 802.11 protocol.
Figure 2:
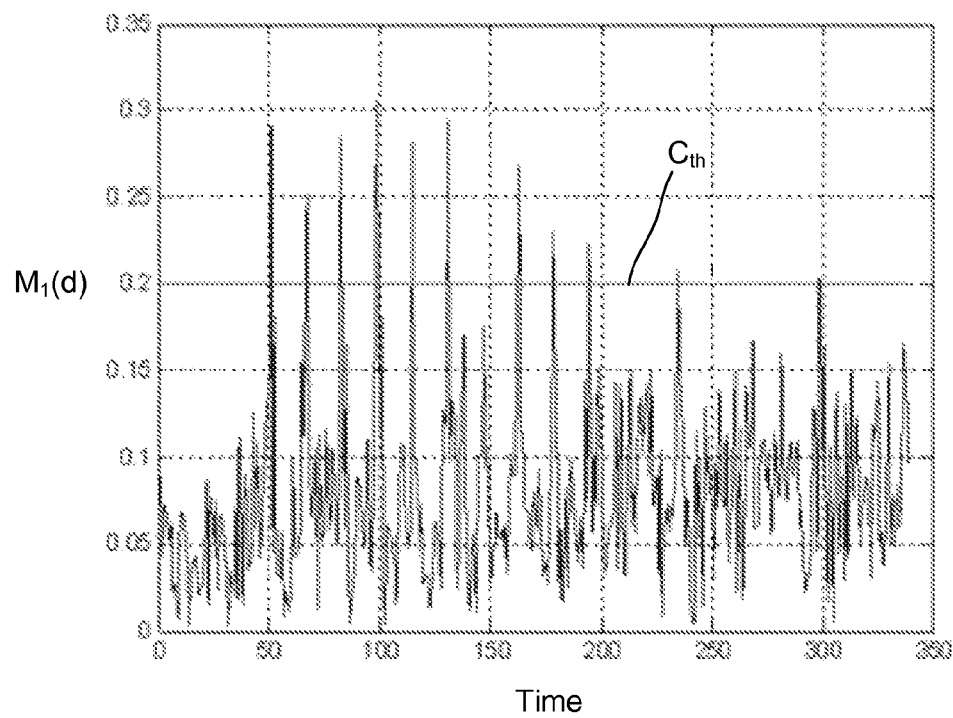
FIG. 2 illustrates an example of how a data frame is located by a conventional method.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Figure 3:
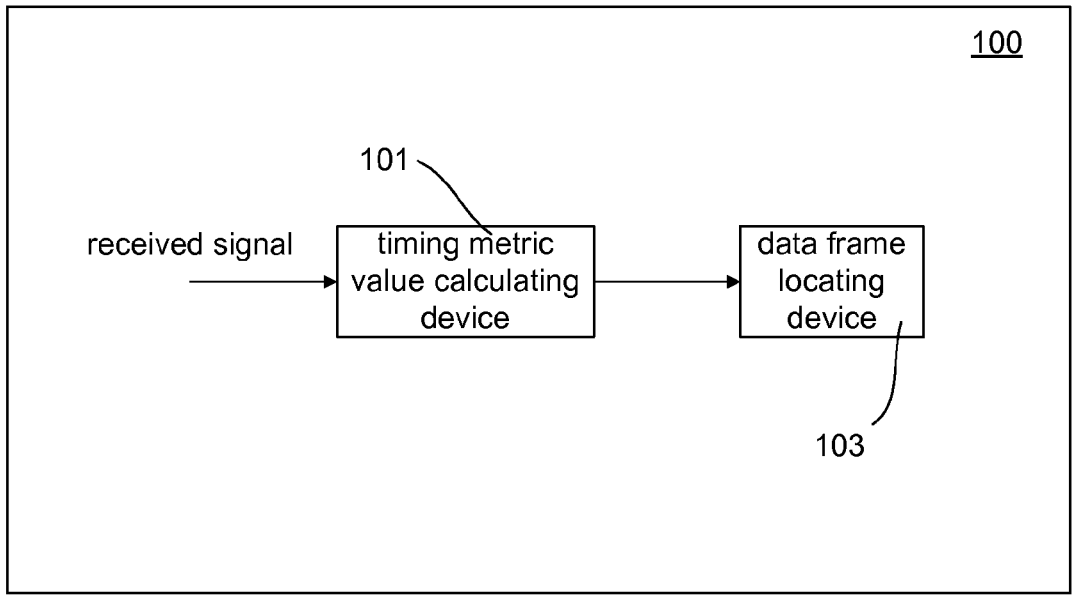
FIG. 3 illustrates a schematic block diagram of a fine timing system according to one embodiment.

FIG. 3 illustrates a schematic block diagram of a fine timing system 100 in a communication system. The system 100 includes a timing metric value calculating device 101 and a data frame locating device 103.

Figure 4:
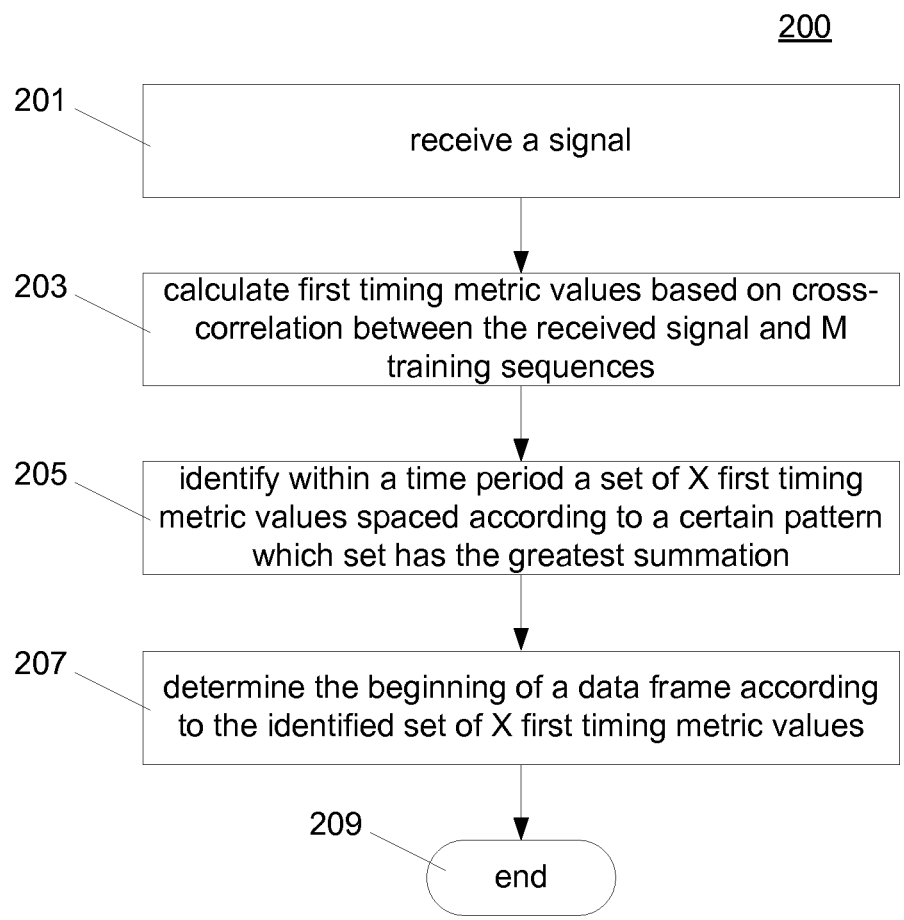
FIG. 4 illustrates a schematic flow chart of a fine timing method according to one embodiment.

FIG. 4 illustrates a schematic flow chart of a fine timing method 200 for communication systems.

In 201, receive a signal. The received signal may be a discrete signal obtained by sampling.

In 203, calculate first timing metric values based on cross-correlation between the received signal and M training sequences known to a transmitter and a receiver (not shown). In one embodiment, the first timing metric values may be calculated by the timing metric calculating device 101.

According to one embodiment, first timing metric values may be calculated according to Equation (2):

$$a(d) = \sum_{k=0}^{Q/2-1} r(k+d) \cdot s*(k) \qquad \text{Equation (2)}$$

where r(d) stands for the received signal, d stands for sampling time point of the received signal, s*(k) stands for conjugation of s(k), s(k) stands for the M training sequences known to the transmitter and the receiver, and Q defines a window for collecting energy of cross-correlation between the received signal and the M training sequences, Q may be any suitable number, for example, Q may be two times the length of a training sequence.

According to one embodiment, first timing metric values may be calculated according to Equation (3) or Equation (4):

$$a(d) = M_1(d) \cdot M_1(d+P \cdot L) \qquad \text{Equation (3)}$$

$$a(d) = M_1(d) \cdot M_1(d-P \cdot L) \qquad \text{Equation (4)}$$

where L stands for the length of one training sequence, P is a predetermined positive integer and $1 \leq P \leq M-2$, and $M_1(d)$ may be calculated according to Equation (5):

$$M_1(d) = \sum_{k=0}^{Q/2-1} r(k+d) \cdot s*(k). \qquad \text{Equation (5)}$$

Figure 3A:
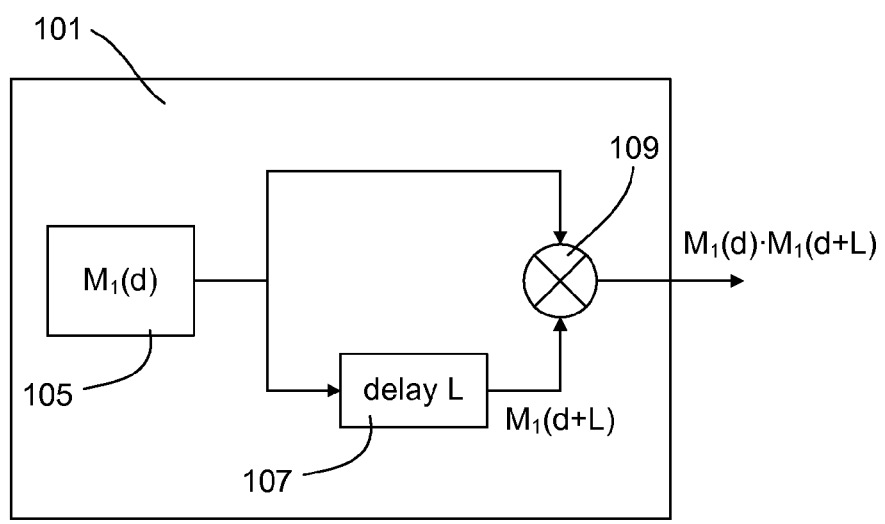
FIG. 3A illustrates a schematic block diagram of the timing metric value calculating device in FIG. 3.

FIG. 3A illustrates a schematic block diagram of the timing metric value calculating device 101. According to one embodiment, the timing metric value calculating device 101 includes a cross-correlation calculating device 105, a delay device 107, and a multiplier 109.

In one embodiment, the cross-correlation calculating device 105 calculates second timing metric values represented by the function $M_1(d)$, and transmits the calculated second timing metric values to both the multiplier 109 and the delay device 107.

In one embodiment, the delay device 107 delays the second timing metric values received from the cross-correlation calculating device 105 by the length of one training sequence, and outputs delayed second timing metric values represented by a function $M_1(d+L)$ to the multiplier 109.

In one embodiment, the multiplier 109 multiplies the second timing metric values from the cross-correlation calculating device 105 and the delayed second timing metric values from the delay device 107 to obtain the first timing metric values.

In 205, identify within a time period a set of X first timing metric values spaced according to a certain pattern which set has the greatest summation. In some embodiments, the time period may be identified by a coarse timing process. As discussed above, locating a data frame may include a coarse timing process and a fine timing process. Coarse timing process approximately locates the beginning of a data frame based on self-correlation of a received signal, and fine timing process locates the beginning of the data frame more accurately based on cross-correlation between the received signal and known training sequences, such that relatively high accuracy can be achieved at relatively low computation complexity.

In one embodiment, the data frame locating device 103 calculates a summation for each set of X first timing metric values within the time period, and identifies the set having the greatest summation.

If the first timing metric values are calculated according to Equation (2), X may equal to M. If the first timing metric values are calculated according to Equation (3) or Equation (4), X may equal to M−P. In one embodiment, P may be set to 1.

In 207, determine the beginning of a data frame according to the identified set of X first timing metric values. In some embodiments, the time point corresponding to the first one of the identified X first timing metric values is taken as the beginning of the data frame. In one embodiment, the data frame locating device 103 determines the beginning of the data frame according to the identified X first timing metric values.

In 209, the method 200 ends.

Example

An experiment was carried out at the below condition.
Vector of Delay Value (ns): [0 100 200 300 400 500 600 700];
Vector of Tap Power (dB): [0 −11.2 −19 −21.9 −25.3 −24.4 −28.0 −26.1];
Doppler Frequency: 1 kHz;
Thresholds of conventional method: 0.2;
Range of SNR: −1 dB~20 dB;
Length of a short training sequence: 16.
In the experiment, first timing metric values were calculated according to Equation (6):

$$a(d) = M_1(d) \cdot M_1(d+16) \quad \text{Equation (6)}$$

where $$M_1(d) = \sum_{k=0}^{15} r(k+d) \cdot s*(k). \quad \text{Equation (7)}$$

In this experiment, a set of 9 first timing metric values evenly spaced by the length of a short training sequence having the greatest summation was identified within a time period identified by a coarse timing process.

Figure 5:
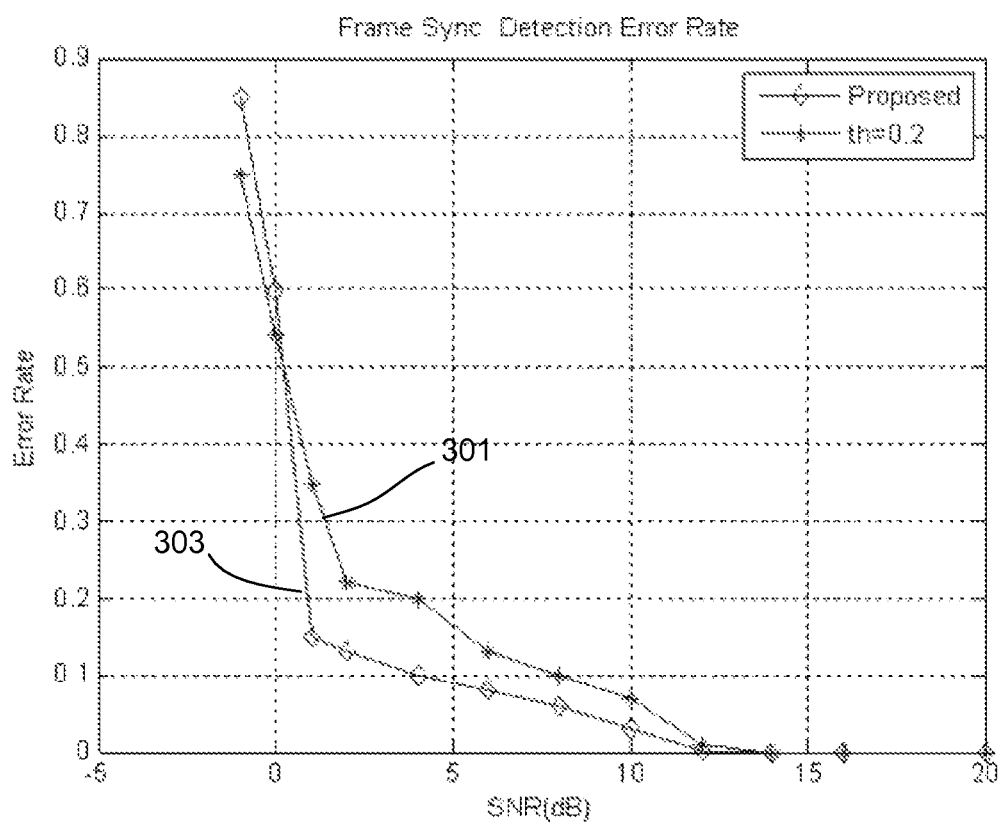
FIG. 5 illustrates error rate plots of a conventional method and a method according to one embodiment obtained in one experiment.

FIG. 5 illustrates error rate plots of a conventional method and a method according to one embodiment obtained under the above condition. Line 301 represents error rate of the conventional method with the threshold of 0.2, Line 303 represents error rate of a method according to one embodiment.

It can be seen from FIG. 5 that under the above conditions, the performance of the method according to one embodiment is better than the conventional method when SNR is greater than 2 dB.

There is little distinction left between hardware and software implementations of aspects of systems; the use of hardware or software is generally a design choice representing cost vs. efficiency tradeoffs. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A fine timing method comprising:
   calculating first timing metric values based on cross-correlation between a received signal and M training sequences;
   identifying within a time period a set of X first timing metric values spaced according to a certain pattern which set of X first timing metric values has a greatest summation; and
   determining a beginning of a data frame based on the identified set of X first timing metric values,
   wherein the first timing metric values are calculated based on multiplication of $M_1(d)$ and $M_1(d+P \cdot L)$, where $M_1(d)$ represents a cross-correlation function between the received signal and the M training sequences, L stands for the length of one training sequence, P is a predetermined positive integer and $1 \leq P \leq M-2$, X equals to M−P.

2. The method of claim 1, wherein the M training sequences have a same length, and the identified set of X first timing metric values are evenly spaced by the length of one training sequence.

3. The method of claim 1, wherein the time period is identified by a coarse timing process.

4. The method of claim 1, wherein X is equal to M.

5. The method of claim 1, wherein the M training sequences are known to a transmitter and a receiver.

6. A fine timing method comprising:
   calculating values of a first timing metric function based on cross-correlation between a received signal and M training sequences within a time period, to obtain a plurality of sets of X values spaced according to a certain pattern;
   calculating summations for the plurality of sets of X values, respectively; and
   determining a beginning of a data frame based on the calculated summations,
   wherein the first timing metric function is based on self-correlation of a second timing metric function which is a cross-correlation function between the received signal and the M training sequences.

7. The method of claim 6, wherein the M training sequences have a same length, and the X values of each set are evenly spaced by a length of one training sequence.

8. The method of claim 6, wherein the first timing metric function is based on multiplication of $M_1(d)$ and $M_1(d+P \cdot L)$, where $M_1(d)$ is a cross-correlation function between the received signal and the M training sequences, where L stands for a length of one training sequence, P is a predetermined positive integer and $1 \leq P \leq M-2$, X equals to M−P.

9. A fine timing system comprising:
a timing metric value calculating device for calculating first timing metric values based on cross-correlation between a received signal and M training sequences; and
a data frame locating device for identifying within a time period a set of X first timing metric values spaced according to a certain pattern which set has a greatest summation, and determining where a data frame begins based on the identified set of X first timing metric values,
wherein the first timing metric values are calculated based on multiplication of $M_1(d)$ and $M_1(d+P \cdot L)$, where $M_1(d)$ is a cross-correlation function between the received signal and the M training sequences, where L stands for a length of one training sequence, P is a predetermined positive integer and $1 \leq P \leq M-2$, X equals to M−P.

10. The system of claim 9, wherein the M training sequences have a same length, and the identified set of X first timing metric values are evenly spaced by the length of one training sequence.

11. The system of claim 9, the time period is identified by a coarse timing process.

12. A fine timing system comprising:
a timing metric value calculating device for calculating values of a first timing metric function based on cross-correlation between a received signal and M training sequences within a time period, where there are a plurality of sets of X values spaced according to a certain pattern in the calculated values of the first timing metric function; and
a data frame locating device for calculating summations for the plurality of sets of X values, respectively, and determining a beginning of a data frame based on the calculated summations,
wherein the timing metric value calculating device comprises a cross-correlation calculating device, a delay device, and a multiplier, and wherein the cross-correlation calculating device calculates second timing metric values represented by a cross-correlation function between the received signal and the M training sequences, and transmits the second timing metric values to both the multiplier and the delay device.

13. The system of claim 12, wherein the M training sequences have a same length, and the X values of each set are evenly spaced by a length of one training sequence.

14. The system of claim 13, wherein the first timing metric function is based on multiplication of $M_1(d)$ and $M_1(d+P \cdot L)$, where $M_1(d)$ is a cross-correlation function between the received signal and the M training sequences, where L stands for the length of one training sequence, P is a predetermined positive integer and $1 \leq P \leq M-2$, X equals to M−P.

15. The system of claim 12, wherein the delay device delays the second timing metric values received from the cross-correlation calculating device by a length of one training sequence, and outputs delayed second timing metric values to the multiplier, and wherein the multiplier multiplies the second timing metric values from the cross-correlation calculating device and the delayed second timing metric values from the delay device to obtain the first timing metric values.

16. The system of claim 15, wherein the first timing metric values are sent to a data frame locating device for locating a data frame.

* * * * *